United States Patent
Egenter et al.

(10) Patent No.: US 11,699,924 B2
(45) Date of Patent: Jul. 11, 2023

(54) METHOD FOR OPERATING AN APPARATUS FOR WIRELESSLY TRANSFERRING ENERGY IN THE DIRECTION OF AN ELECTRICAL CONSUMER BY MEANS OF INDUCTIVE COUPLING, APPARATUS AND SYSTEM

(71) Applicant: E.G.O. Elektro-Geraetebau GmbH, Oberderdingen (DE)

(72) Inventors: Christian Egenter, Bretten (DE); Max-Felix Mueller, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 0 days.

(21) Appl. No.: 17/590,048

(22) Filed: Feb. 1, 2022

(65) Prior Publication Data

US 2022/0255355 A1    Aug. 11, 2022

(30) Foreign Application Priority Data

Feb. 9, 2021    (DE) .................. 10 2021 201 220.5

(51) Int. Cl.
*H02J 50/12*    (2016.01)
*H02J 50/80*    (2016.01)

(52) U.S. Cl.
CPC .............. *H02J 50/12* (2016.02); *H02J 50/80* (2016.02)

(58) Field of Classification Search
CPC ........ H02J 50/12; H02J 50/80; H02M 7/5387; H02M 7/4815; H02M 7/538;
(Continued)

(56) References Cited

U.S. PATENT DOCUMENTS

2008/0035633 A1*  2/2008  Weiss .................. H05B 6/102
                                                    219/664
2008/0136343 A1*  6/2008  Yu ..................... H05B 41/2827
                                                    315/219
(Continued)

FOREIGN PATENT DOCUMENTS

EP           2445306 A2 *   4/2012    ............. H05B 6/062

OTHER PUBLICATIONS

Merriam-Webster," definition of efficiency," pp. 1-2 (Year: NA).*
(Continued)

*Primary Examiner* — Pinping Sun
(74) *Attorney, Agent, or Firm* — Alston & Bird LLP

(57) ABSTRACT

Method for operating an apparatus for wirelessly transferring energy in the direction of an electrical consumer by means of inductive coupling, wherein the apparatus comprises:
  a rectifier for generating a DC voltage from a power supply system voltage,
  an inverter fed from the DC voltage and configured to generate a pulse-width-modulated drive signal, and
  a coil driven by means of the pulse-width-modulated drive signal, by means of which coil an alternating magnetic field is generatable for the purpose of transferring the energy,
wherein the method comprises the following steps:
  controlling an electrical actual power output by the inverter to a predefinable electrical target power, wherein a frequency and a duty cycle of the pulse-width-modulated drive signal serve as manipulated variables of the control, (Continued)

wherein the following steps are carried out for the purpose of adjustment to the target power:

a) setting a start frequency (f_0),
b) setting a start duty cycle (DC_1) in such a way that the target power is undershot,
c) measuring an electrical actual power output by the inverter in the case of the start frequency (f_0) set and the start duty cycle (DC_1) set,
d) choosing an adjustment target power which is less than or equal to the target power,
e) calculating a duty cycle (DC_2) which computationally corresponds to the adjustment target power,
f) setting the calculated duty cycle (DC_2),
g) measuring an electrical actual power output by the inverter in the case of the frequency (f_0) set and the duty cycle (DC_2) set, and
h) repeating steps d) to g) with increasing adjustment target power until a deviation between the target power and the actual power falls below a predefined threshold.

13 Claims, 1 Drawing Sheet

(58) Field of Classification Search
CPC .. H02M 7/5395; Y02T 10/70; Y02T 10/7072; Y02T 10/72; Y02T 90/12; Y02T 90/14; H05B 6/12
See application file for complete search history.

(56) References Cited

U.S. PATENT DOCUMENTS

| | | |
|---|---|---|
| 2009/0174263 A1* | 7/2009 | Baarman ................ H02J 50/12 307/104 |
| 2011/0304216 A1 | 12/2011 | Baarman et al. |
| 2014/0133193 A1* | 5/2014 | Tzeng ............... H02M 3/33515 363/21.15 |
| 2014/0192567 A1* | 7/2014 | Balocco .................... H02J 3/46 363/40 |
| 2016/0094278 A1 | 3/2016 | Khandelwal et al. |
| 2016/0365752 A1* | 12/2016 | Misawa .............. H02J 7/00712 |
| 2017/0025899 A1* | 1/2017 | Misawa .................. H02J 50/12 |
| 2017/0187240 A1* | 6/2017 | Cho ........................ H02J 50/12 |
| 2018/0194236 A1* | 7/2018 | Elshaer .................. B60L 53/12 |
| 2019/0084426 A1* | 3/2019 | Tanaka ................ B60L 15/2009 |

OTHER PUBLICATIONS

German Patent and Trade Mark Office, Office Action received for Application No. 102021201220.5, dated Dec. 8, 2021, 7 pages, Germany.

European Patent Office, Extended European Search Report received for Application No. 22153973.7, dated Jul. 4, 2022, 11 pages, Germany.

* cited by examiner

METHOD FOR OPERATING AN APPARATUS FOR WIRELESSLY TRANSFERRING ENERGY IN THE DIRECTION OF AN ELECTRICAL CONSUMER BY MEANS OF INDUCTIVE COUPLING, APPARATUS AND SYSTEM

CROSS-REFERENCE TO RELATED APPLICATIONS

This application claims priority to German Application No. 10 2021 201 220.5, filed Feb. 9, 2021, the contents of which are hereby incorporated herein in its entirety by reference.

FIELD OF APPLICATION

The invention relates to a method for operating an apparatus for wirelessly transferring energy in the direction of an electrical consumer by means of inductive coupling, an apparatus and a system.

OBJECT AND SOLUTION

The invention is based on the object of providing a method for operating an apparatus for wirelessly transferring energy in the direction of an electrical consumer by means of inductive coupling, an apparatus and a system which enable operation that is as reliable and flexible as possible.

The method serves for operating an apparatus for wirelessly transferring energy in the direction of an electrical consumer by means of inductive coupling, also referred to as Wireless Power Transfer, WPT. With regard to the principles concerning WPT, reference should also be made to the relevant technical literature. Preferably, the apparatus is operated in accordance with the WPC (Wireless Power Consortium) Ki (Cordless Kitchen) method.

The apparatus for wirelessly transferring energy in the direction of an electrical consumer by means of inductive coupling can also be referred to as a transmitter, and the electrical consumer can be referred to as a receiver.

The apparatus comprises a conventional single-phase or polyphase rectifier for generating a DC voltage from an in particular sinusoidal power supply system voltage.

The apparatus comprises an inverter fed from the DC voltage. The inverter can be for example a half-bridge inverter or a full-bridge inverter. The inverter is configured to generate a pulse-width-modulated drive signal, in particular in the form of a pulse-width-modulated drive voltage.

The apparatus comprises a conventional coil or transmitter coil driven by means of the inverter or the pulse-width-modulated drive signal thereof and configured to generate an alternating magnetic field for the purpose of transferring the energy.

The method comprises the following steps.

The electrical actual power output by the inverter is controlled to a predefinable electrical target power, wherein a frequency and a duty cycle of the pulse-width-modulated drive signal serve as manipulated variables of the control. In the case of an inverter having a half-bridge, in this case the duty cycle of the pulse-width-modulated drive signal generated by means of the inverter, which signal constitutes a periodic sequence of pulses, specifies the ratio of the pulse duration to the period duration. The duty cycle is specified as a ratio number of the dimension number with a value range of 0 to 1 or 0 to 100%. In the case of an inverter having a full-bridge, the duty cycle can for example denote a phase angle of the two rectangular-wave form signals generated by means of the associated bridge branches and assume values of between 0° and 360°.

For adjustment to the target power, for example proceeding from an actual power of 0 W, the following steps are carried out.

In a step a) firstly a start frequency of the pulse-width-modulated drive signal is set.

In a step b) a start duty cycle of the pulse-width-modulated drive signal is set in such a way that the target power is definitely undershot. Such a start duty cycle can be determined by experiments and/or computationally, for example, wherein a duty cycle of 15% constitutes a suitable start value in accordance with the above criterion for many cases. The start duty cycle can be chosen depending on the target power. The higher the target power, the higher the start duty cycle can be chosen as well.

Step c) involves measuring an electrical actual power output by the inverter in the case of the start frequency set and the start duty cycle set. The power output by the inverter can be determined for example conventionally by voltage and current measurement and suitable computation of the measured variables. For the rest, in this respect reference should likewise be made to the relevant technical literature.

A step d) involves choosing an adjustment target power which is less than or equal to the target power. Preferably, a difference between the previously measured electrical actual power and the next adjustment target power is chosen not to be too large. By way of example, the initial adjustment target power can in principle correspond to a predefinable or predefined proportion of the target power or of the previously measured actual power, for example correspond to ±80% of the previously measured actual power.

In a step e) a duty cycle of the pulse-width-modulated drive signal is calculated which computationally corresponds to the adjustment target power.

In a step f) the calculated duty cycle is set.

A step g) involves determining an electrical actual power output by the inverter in the case of the frequency set and the duty cycle set.

A step h) involves repeating steps d) to g) with continuously increasing adjustment target power until a deviation between the target power and the actual power established falls below a predefined threshold. The threshold can be predefined in absolute or relative terms and can be for example 30 watts or 2% of the target power, to mention merely exemplary numerical values.

The increase in the adjustment target power can be chosen in such a way that a number of repetitions is restricted to 3 repetitions, in particular 2 repetitions, in particular 1 repetition.

The method according to the invention allows a very rapid adjustment of the actual power to a target power and limits overshoot that could result in an overvoltage in the consumer. Furthermore, the method according to the invention imposes only minor requirements in respect of knowledge about the real behavior of the transfer path.

In an embodiment, in step e) the duty cycle which computationally corresponds to the adjustment target power is calculated on the basis of the duty cycle calculated in the preceding step f), the actual power measured in the preceding step g) and the present or the instantaneous adjustment target power.

The calculation of the duty cycle is described by way of example below.

It holds true that:

$$P \sim U^2 * \cos^2\phi \quad \text{for } \text{Re}(\underline{Z}) = \text{constant}$$

The term $\phi$ denotes a phase angle between current and voltage. For frequencies in proximity to a resonant frequency $\cos \phi \approx 1$. For a constant working frequency $\cos \phi$ may be estimated as constant and may thus be disregarded like the term $\text{Re}(\underline{Z})$ in the following calculations.

$$\text{U\_DC} = \text{U\_N} * \sin(\Pi * \text{DC}) \quad \text{with DC} = 0 \ldots 50\%$$

In this case, DC denotes the duty cycle. U_N denotes a root-mean-square value of a sinusoidal power supply system voltage rectified by means of the rectifier. U_DC denotes a root-mean-square value of the pulse-width-modulated drive voltage generated by means of the inverter for a given duty cycle DC.

A control-level-independent linear and time-invariant impedance $\underline{Z}$ is assumed for the calculation. The operating frequency between two steps must be identical since $\underline{Z}(f)$ usually behaves nonlinearly in relation to a frequency change. If the operating frequency is intended to be changed after one step, then it is first necessary once again to choose an initial duty cycle and to measure the new power for the new frequency before the calculation formulae mentioned are allowed to be applied again.

Hereinafter, the duty cycle calculated in the preceding step e) is designated as DC_old. The actual power measured in the preceding step g) is designated as P_old. The frequency set in the preceding step is designated as f_old. The chosen adjustment target power of the present or instantaneous step d) is designated as P_new. The duty cycle to be calculated is designated as DC_new. The root-mean-square value of the pulse-width-modulated drive voltage generated by means of the inverter in the preceding step is designated as U_DC_old. The root-mean-square value of the pulse-width-modulated drive voltage generated by means of the inverter in the present step is designated as U_DC_new.

Preferably, P_new is chosen to be maximally between 2.5 times or 2 times P_old in order to keep errors as a result of nonlinearity (amplitude, temperature, share of the higher harmonic oscillations, switching delays, etc.) of a real part of Z(f) within acceptable bounds. The ratio of P_new to P-old can be chosen to be increasingly smaller for each subsequent repetition.

It holds true that:

$$\text{U\_DC\_new} = \sqrt{\frac{\text{P\_new}}{\text{P\_old}}} * \text{U\_DC\_old}$$

holds true for $\underline{Z}$ (f_new) = $\underline{Z}$ (f_old)

$$\sin(\pi * \text{DC\_new}) = \sqrt{\frac{\text{P\_new}}{\text{P\_old}}} * \sin(\pi * \text{DC\_old})$$

for f_old = f_new and U_N = constant

The above formula can finally be solved with respect to DC_new by applying the inverse function arc sine.

In an embodiment, the adjustment target power for the, in particular first, repetition of steps d) to g) is limited to 2.5 times, in particular 2 times, the adjustment target power chosen in the preceding step d). Accordingly, the adjustment target power chosen for the first time, i.e. the adjustment target power chosen before a repetition of steps d) to g) can be limited to 2.5 times, in particular 2 times, the electrical actual power measured in step c).

In an embodiment, once the deviation between the target power and the actual power falls below the predefined threshold, the frequency and the duty cycle are altered, with the target power theoretically remaining the same, until an operating point formed from frequency and duty cycle is established which satisfies an optimization criterion.

In an embodiment, the optimization criterion is a minimum electrical power loss of the inverter.

In an embodiment, the operating point which satisfies the optimization criterion, in the case of a half-bridge inverter, has a duty cycle of greater than 40%, in particular has a duty cycle of close to 50%. In the case of a full-bridge inverter, the operating point which satisfies the optimization criterion has a phase angle between the two bridge branches of the full-bridge of >150°, in particular of close to 180°. In an embodiment with a plurality of inverters, synchronization with respect to a common operating frequency can constitute an optimization criterion.

In an embodiment, the start frequency is based on data which are communicated to the apparatus by the electrical consumer. The magnitude of the coil diameter of the receiver, the rated power thereof or further data which can be used for system characterization allow the apparatus for example to estimate the transfer function P(f) and to select a suitable start frequency f_0 together with the target power.

In an embodiment, in step g) at least one switching current when switching off a semiconductor switch of the inverter is determined in addition to the actual power, wherein the frequency for a subsequent repetition of steps d) to g) is increased if the switching current exceeds a capacitive limit value. In this case, capacitive means that the current was forced after a sign change to a parallel diode with respect to the switch, such that the next switch can no longer be switched on in a current-free manner. The greater the switching current, the greater the losses. If the switching current for a given duty cycle is too high, then this indicates an operating frequency chosen too low.

The apparatus according to the invention serves for wirelessly transferring energy in the direction of an electrical consumer by means of inductive coupling and is configured for carrying out the method described above.

The apparatus comprises: a rectifier for generating a DC voltage from a power supply system voltage, an inverter fed from the DC voltage, a coil driven by means of the inverter, by means of which coil an alternating magnetic field is generatable for the purpose of transferring the energy, and a control unit configured to drive the inverter in such a way that a method described above is carried out.

In an embodiment, the apparatus is part of an induction hob.

The system according to the invention comprises an above-described apparatus for wirelessly transferring energy in the direction of an electrical consumer by means of inductive coupling, and an electrical consumer.

BRIEF DESCRIPTION OF THE DRAWINGS

The invention is described in detail below with reference to the drawings, in which.

DETAILED DESCRIPTION OF THE EXEMPLARY EMBODIMENTS

Figure 1:
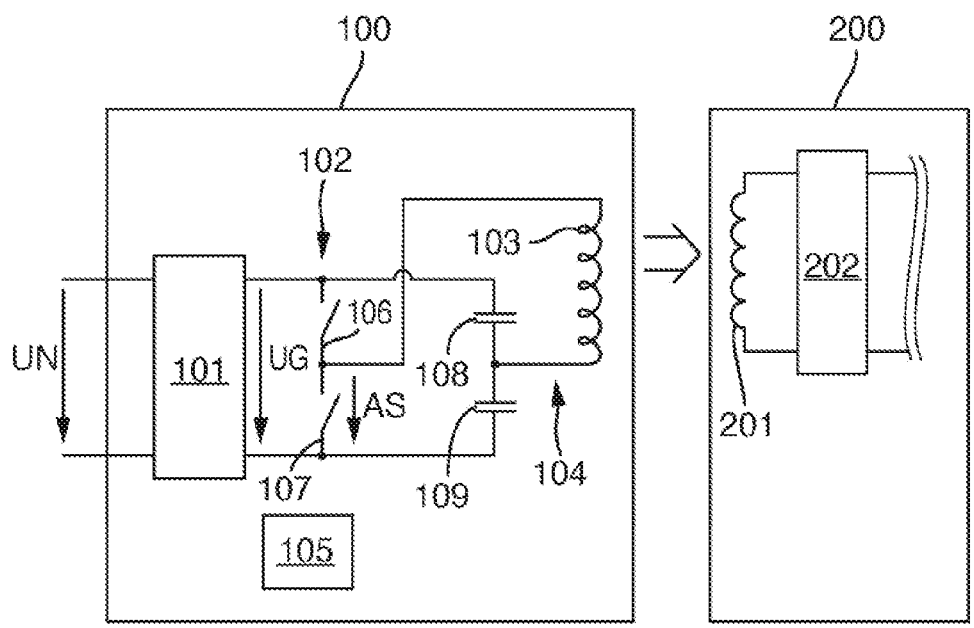
FIG. 1 shows highly schematically a system comprising an apparatus for wirelessly transferring energy in the direction of an electrical consumer by means of inductive coupling and an electrical consumer supplied by means of the apparatus.

FIG. 1 shows highly schematically a system comprising an apparatus 100 for wirelessly transferring energy or electrical power in the direction of an electrical consumer 200 by means of inductive coupling and an electrical consumer 200. Systems of this type are known in principle and are also referred to as WPT systems.

The apparatus 100 can for example be part of an induction hob or form an induction hob.

The apparatus 100 comprises a conventional rectifier 101 for generating a DC voltage UG from a single-phase sinusoidal power supply system voltage UN. The rectifier 101 can be realized as a bridge rectifier, for example.

The apparatus 100 furthermore comprises a half-bridge inverter 102 fed from the DC voltage UG. The inverter 102 comprises two semiconductor switching means 106 and 107 looped in series between the output of the rectifier 101.

The apparatus 100 furthermore comprises a coil 103 driven by means of the inverter 102, by means of which coil an alternating magnetic field is generatable for the purpose of transferring the energy. For this purpose, the inverter 102 generates a pulse-width-modulated drive signal AS, which serves for driving the coil 103 or a resonant circuit 104 comprising the coil 103.

The coil 103 is inductively coupled to a receiver coil 201 of the electrical consumer 200, wherein a rectifier 202 and also a resonance capacitor and further components—not illustrated in more specific detail—of the electrical consumer 200 are connected downstream of the receiver coil 201. For the rest, in this respect reference should also be made to the relevant technical literature. The consumer 200 typically includes an operator control part that enables an operating mode to be selected. Depending on the operating mode, a target power is chosen and transferred to the apparatus. In a configuration phase, further system parameters of the consumer can be communicated to the apparatus.

The apparatus 100 furthermore comprises two capacitors 108 and 109 looped in series between the output of the rectifier 101. The coil 103 is looped in between a connecting node of the semiconductor switching means 106 and 107 and a connecting node of the capacitors 108 and 109. For the rest, with regard to this topology known per se, reference should also be made to the relevant technical literature.

The apparatus 100 furthermore comprises a control unit 105, for example in the form of a conventional microprocessor, which controls the operation of the apparatus 100 as described below.

The control unit 105 controls an electrical actual power output by the inverter 102 to a predefinable electrical target power, wherein a frequency and a duty cycle of the pulse-width-modulated drive signal AS serve as manipulated variables of the control. In this respect, reference should also be made to the relevant technical literature.

Figure 2:
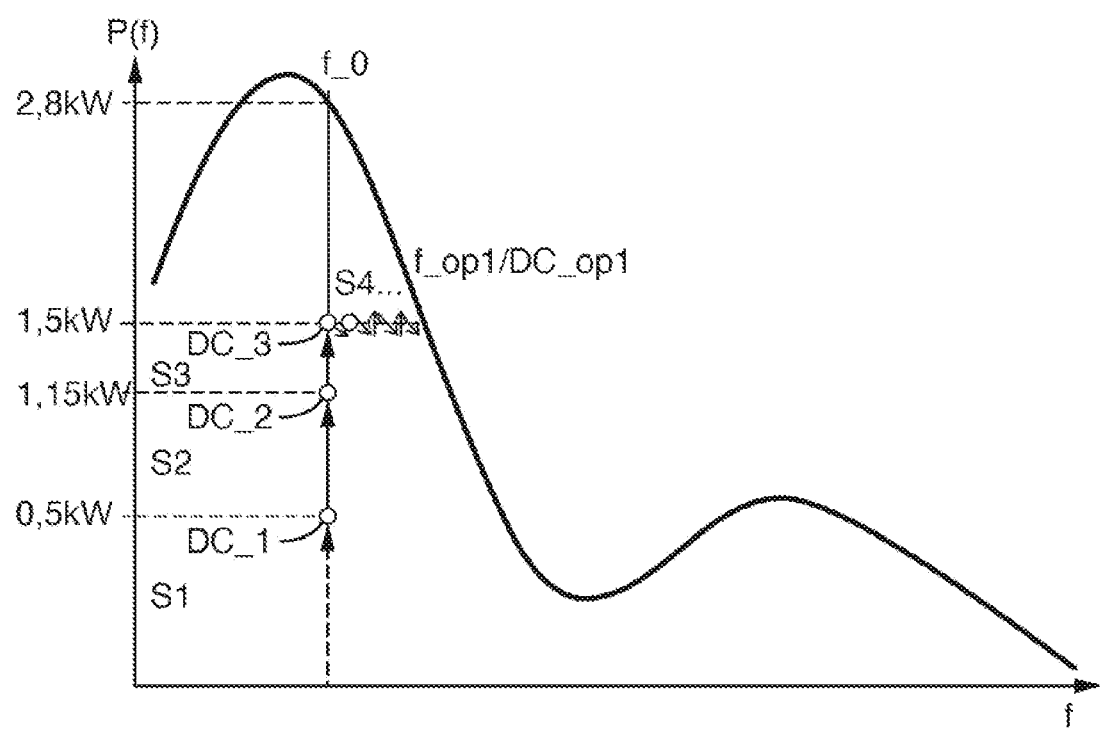
FIG. 2 shows an exemplary transfer function which characterizes an electrical power transferable in the direction of the electrical consumer by means of the apparatus via the frequency, and schematically a step sequence according to the invention for adjusting the electrical power output by the apparatus to a set electrical target power.

FIG. 2 shows a transfer function P(f), wherein the transfer function P(f) characterizes an electrical power P transferable in the direction of the electrical consumer 200 by means of the apparatus 100 via the frequency f in the case of a duty cycle of 50%.

The process of adjustment to the target power according to the invention is described below.

In the explanations below, the target power toward which adjustment is to be effected is assumed to be 1.5 kW by way of example.

In the explanations below, furthermore, the apparatus 100 for wirelessly transferring energy is referred to as transmitter and the electrical consumer 200 is referred to as receiver. Accordingly, the coil 103 of the apparatus or of the transmitter 100 is referred to as transmitter coil and the corresponding coil 201 of the electrical consumer or receiver 200 is referred to as receiver coil.

The control unit 105 or the controller thereof does not (yet) know the transfer function P(f) at the time of the start of the control. Nevertheless, the intention is to effect adjustment toward the required target power in a small number of control steps by means of suitable setting of frequency and duty cycle of the drive signal AS. In the present case, just 3 steps are required for adjustment toward the target power, wherein efficiency optimization steps may also follow with the power remaining constant.

The transmitter 100, thanks to its installation situation, knows the coupling range and, on the basis of the known rated and target power and also the size of the receiver coil 201, can roughly estimate what operating frequency f typically results in the desired power.

In a first step sequence S1, a start frequency $f\_0$ is chosen, which is typically somewhat lower than the optimum frequency in order to keep power reserves available. In the present case, for example, a frequency of 28 KHz is chosen as the start frequency $f\_0$. By monitoring a switching current of the inverter 102, it is possible for an incorrectly chosen start frequency $f\_0$ to be identified and then chosen differently.

Consequently, in the first step sequence S1, the start frequency $f\_0$ of the pulse-width-modulated drive signal AS of 28 kHz is set and a start duty cycle $DC\_1$ is set in such a way that the resulting actual power is definitely less than the target power. By way of example, a start duty cycle $DC\_1$ of 15% can be set. The smaller the target power, the smaller the start duty cycle $DC\_1$ should be chosen.

The first step sequence S1 subsequently involves measuring an electrical actual power output by the inverter 102 in the case of the start frequency $f\_0$ set and the start duty cycle $DC\_1$ set. In the present case, the measured actual power is 500 W.

In a subsequent step sequence S2, an adjustment target power of 1250 W is then chosen, which is close to the target power of 1500 W but is somewhat less than the latter. The adjustment target power of 1250 W amounts to 2.5 times the previously measured actual power.

In the step sequence S2, a duty cycle DC2 is then calculated and set which given linearity would result in the chosen adjustment target power of 1250 W, i.e. computationally corresponds to the adjustment target power—linearity being presupposed. In the present case, this duty cycle DC2 is 25%.

The step sequence S2 then involves once again measuring the electrical actual power output by the inverter 102 in the case of the frequency $f\_0$ set and the duty cycle $DC\_2$ set. On account of the non-linearity, the measured power is not 1250 W, but rather only 1150 W.

In a subsequent step sequence S3, an adjustment target power of 1500 W is chosen, which corresponds to the target power of 1500 W. Impermissible overshooting of the power output on account of the chosen adjustment target power of 1500 W can be ruled out since the change in power between two steps is intended to be limited and a sufficient linearity may be presupposed within the remaining power range between 1250 W and 1500 W.

In the step sequence S3, a duty cycle DC3 is then calculated and set which given linearity would result in the chosen adjustment target power of 1500 W, i.e. computationally corresponds to the adjustment target power—linearity being presupposed. In the present case, the duty cycle DC3 is 32%.

The step sequence S3 then involves measuring the electrical actual power output by the inverter 102 in the case of the frequency f_0 set and the duty cycle DC_3 set. In the present case, the measured actual power corresponds to the target power.

Therefore, subsequently proceeding from the operating point of the drive signal AS with the frequency f_0 and the duty cycle DC_3, an operating point of the drive signal AS with the frequency f_op1 and the duty cycle DC_op1 of 50% is approached in a plurality of step sequences S4 to Sn, wherein step by step in each case the frequency f is increased and the duty cycle DC is adapted.

The variable dP/df in the case of a constant duty cycle DC shows how the transfer function P(f) progresses for the frequency f, such that it is possible for example to identify minima or a frequency on the left-hand side of a peak of the transfer function P(f).

The invention claimed is:

1. A system, comprising: an apparatus (100) being part of an induction hob for wirelessly transferring energy in a direction of an electrical consumer (200) by inductive coupling, the apparatus (100) comprising:
a rectifier (101) for generating a DC voltage (UG) from a power supply system voltage (UN), an inverter (102) fed from the DC voltage (UG) and configured to generate a pulse-width-modulated drive signal (AS), a coil (103) driven by the pulse-width-modulated drive signal (AS), via which an alternating magnetic field is generated to transfer the energy, a control unit (105) configured to control the inverter (102) to output an electrical actual power output to a pre-defined electrical target power, wherein a frequency and a duty cycle of the pulse-width-modulated drive signal (AS) serve as manipulated control variables, and
the electrical consumer (200),
wherein the control unit (105) carries out to adjust to the pre-defined electrical target power:
a) setting a start frequency (f_0),
b) setting a start duty cycle (DC_1) in such a way that the pre-defined electrical target power is undershot,
c) measuring an electrical actual power output by the inverter (102) at the start frequency (f_0) and the start duty cycle (DC_1), d) choosing an adjustment target power which is less than or equal to the pre-defined electrical target power,
e) calculating a duty cycle (DC_2) which computationally corresponds to the adjustment target power, f) setting the calculated duty cycle (DC 2), g) measuring an electrical actual power output by the inverter (102) in a case of the start frequency (f_0) and the calculated duty cycle (DC_2), and
h) repeating steps d) to g) with increasing the adjustment target power until a deviation between the pre-defined electrical target power and the electrical actual power falls below a predefined threshold, wherein, during this repetition, in subsequent iterations of step e), a new duty cycle (DC 3) which computationally corresponds to the adjustment target power is calculated on a basis of a combination of (i) the duty cycle (DC_2) calculated in the preceding iteration of step e), (ii) the electrical actual power measured in the preceding iteration of step g), and (iii) the adjustment target power.

2. The system of claim 1, wherein the adjustment target power for the repetition of steps d) to g) is limited to 2.5 times the adjustment target power chosen in the preceding step d).

3. The system of claim 1, wherein once the deviation between the pre-defined electrical target power and the electrical actual power falls below the predefined threshold, the frequency and the duty cycle are altered, with the pre-defined electrical target power remaining the same, until an operating point formed from an optimal frequency (f_op1) and duty cycle combination is established which satisfies an optimization criterion.

4. The system of claim 3, wherein the optimization criterion is a minimum electrical power loss of the inverter (102).

5. The system of claim 4, wherein the operating point which satisfies the optimization criterion, in a case of a half-bridge inverter (102), has a duty cycle of greater than 40%.

6. The system of claim 1, wherein the start frequency (f_0) is based on data which are communicated to the apparatus (100) by the electrical consumer (200).

7. The system of claim 1, wherein, in step g), at least one switching current when switching off a semiconductor switch (106, 107) of the inverter (102) is determined in addition to the electrical actual power, wherein the frequency for a subsequent repetition of steps d) to g) is increased if the at least one switching current exceeds a limit value.

8. A method for operating an apparatus (100) for wirelessly transferring energy in a direction of an electrical consumer (200) by inductive coupling, the method comprising steps of:
a) providing an apparatus (100) comprising:
a rectifier (101) for generating a DC voltage (UG) from a power supply system voltage (UN), an inverter (102) fed from the DC voltage (UG) and configured to generate a pulse-width-modulated drive signal (AS),
a coil (103) driven by the pulse-width-modulated drive signal (AS), via which an alternating magnetic field is generated to transfer the energy, and
a control unit (105) configured to control the inverter (102) to output an electrical actual power output to a pre-defined electrical target power, wherein a frequency and a duty cycle of the pulse-width-modulated drive signal (AS) serve as manipulated control variables,
b) setting a start frequency (f_0), c) setting a start duty cycle (DC_1) in such a way that the pre-defined electrical target power is undershot,
d) measuring an electrical actual power output by the inverter (102) at the start frequency (f_0) and the start duty cycle (DC_1),
e) choosing an adjustment target power which is less than or equal to the pre-defined electrical target power,
f) calculating a duty cycle (DC_2) which computationally corresponds to the adjustment target power,
g) setting the calculated duty cycle (DC_2), h) measuring an electrical actual power output by the inverter (102) in a case of the start frequency (f_0) and the calculated duty cycle (DC_2), and i) repeating steps e) to h) with increasing the adjustment target power until a deviation between the pre-defined electrical target power and the electrical actual power falls below a predefined threshold, wherein, during this repetition, in subsequent iterations of step f), a new duty cycle (DC_3) which computationally corresponds to the adjustment target power is calculated on a basis of a combination of (I) the duty cycle (DC_2) calculated in the preceding iteration of step f), (II) the electrical actual power measured in the preceding iteration of step h), and (iii) the adjustment target power, wherein:

in step h), at least one switching current when switching off a semiconductor switch (106, 107) of the inverter (102) is determined in addition to the electrical actual power, and the frequency for the subsequent repetition of steps e) to h) is increased if the at least one switching current exceeds a capacitive limit value.

9. The method of claim 8, wherein the adjustment target power for the repetition of steps e) to h) is limited to 2.5 times the adjustment target power chosen in the preceding step e).

10. The method of claim 8, wherein once the deviation between the pre-defined electrical target power and the electrical actual power falls below the predefined threshold, the frequency and the duty cycle are altered, with the pre-defined electrical target power remaining the same, until an operating point formed from an optimal frequency (f_op1) and duty cycle combination is established which satisfies an optimization criterion.

11. The method of claim 10, wherein the optimization criterion is a minimum electrical power loss of the inverter (102).

12. The method of claim 11, wherein the operating point which satisfies the optimization criterion, in a case of a half-bridge inverter (102), has a duty cycle of greater than 40%.

13. The method of claim 8, wherein the start frequency (f_0) is based on data which are communicated to the apparatus (100) by the electrical consumer (200).

\* \* \* \* \*